United States Patent
Scofield et al.

(10) Patent No.: US 8,214,475 B1
(45) Date of Patent: Jul. 3, 2012

(54) SYSTEM AND METHOD FOR MANAGING CONTENT INTEREST DATA USING PEER-TO-PEER LOGICAL MESH NETWORKS

(75) Inventors: Christopher L. Scofield, Seattle, WA (US); Brad E. Marshall, Bainbridge Island, WA (US); Elmore Eugene Pope, Sammamish, WA (US); Eric B. Merritt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 380 days.

(21) Appl. No.: 11/847,998

(22) Filed: Aug. 30, 2007

(51) Int. Cl.
*G06F 15/173* (2006.01)

(52) U.S. Cl. ........ 709/223; 709/217; 709/221; 709/229; 709/238

(58) Field of Classification Search .................. 709/203, 709/217, 223, 229, 238, 243
See application file for complete search history.

(56) References Cited

U.S. PATENT DOCUMENTS

| | | | | |
|---|---|---|---|---|
| 5,974,236 | A * | 10/1999 | Sherman | 709/221 |
| 6,055,568 | A * | 4/2000 | Adams | 709/221 |
| 7,058,730 | B2 | 6/2006 | Harbin | |
| 7,089,301 | B1 * | 8/2006 | Labio et al. | 709/224 |
| 7,174,382 | B2 * | 2/2007 | Ramanathan et al. | 709/227 |
| 7,583,682 | B2 * | 9/2009 | Hopkins | 370/401 |
| 7,818,402 | B1 * | 10/2010 | Zhang | 709/219 |
| 7,831,928 | B1 * | 11/2010 | Rose et al. | 715/810 |
| 2002/0055972 | A1 * | 5/2002 | Weinman, Jr. | 709/203 |
| 2003/0182428 | A1 * | 9/2003 | Li et al. | 709/227 |
| 2003/0217139 | A1 * | 11/2003 | Burbeck et al. | 709/224 |
| 2005/0102282 | A1 * | 5/2005 | Linden | 707/3 |
| 2005/0180418 | A1 * | 8/2005 | Andersen et al. | 370/389 |
| 2006/0039298 | A1 | 2/2006 | Zuniga | |
| 2006/0080454 | A1 * | 4/2006 | Li | 709/231 |
| 2006/0126611 | A1 | 6/2006 | Kelly | |
| 2006/0212584 | A1 * | 9/2006 | Yu et al. | 709/227 |
| 2006/0218225 | A1 * | 9/2006 | Hee Voon et al. | 709/201 |

(Continued)

OTHER PUBLICATIONS

StumbleUpon, "About", Apr. 24, 2006, retrieved from <http://replay.waybackmachine.org/20060424173215/http://www.stumbleupon.com/about.html>.*

(Continued)

*Primary Examiner* — Emmanuel L Moise
*Assistant Examiner* — Sarah Drabik
(74) *Attorney, Agent, or Firm* — Robert C. Kowert; Meyertons, Hood, Kivlin, Kowert & Goetzel, P.C.

(57) ABSTRACT

Managing content interest data using peer-to-peer logical mesh networks. Instructions may be processor-executable to implement a given logical node of a logical mesh network that includes a number of such nodes. The given logical node may be configured to store identifying information of its peer nodes. In response to detecting a message-passing event, the given logical node may be configured to generate and convey an outgoing message, which may correspond to respective network-based content and may include indicia of the content, to its peer nodes. The given logical node may not convey the outgoing message to any node that is not a peer. Dependent upon indicia of network-based content included in an incoming message received from a given one of its peer nodes, the given logical node may be further configured to update its identifying information to add or delete a particular node as a peer node.

49 Claims, 5 Drawing Sheets

U.S. PATENT DOCUMENTS

| | | | |
|---|---|---|---|
| 2007/0150498 A1* | 6/2007 | Li et al. | 707/101 |
| 2007/0171917 A1 | 7/2007 | Dai | |
| 2007/0214259 A1* | 9/2007 | Ahmed et al. | 709/224 |
| 2007/0281716 A1 | 12/2007 | Altman | |
| 2008/0016205 A1* | 1/2008 | Svendsen | 709/224 |
| 2008/0056269 A1* | 3/2008 | Madhani et al. | 370/395.2 |
| 2008/0056500 A1* | 3/2008 | Bradley et al. | 380/279 |
| 2008/0084875 A1* | 4/2008 | Parkkinen et al. | 370/389 |
| 2008/0133767 A1* | 6/2008 | Birrer et al. | 709/231 |
| 2008/0147659 A1* | 6/2008 | Chen et al. | 707/7 |
| 2009/0119265 A1* | 5/2009 | Chou et al. | 707/3 |

OTHER PUBLICATIONS

Liang, Bangyong, et al., "Keyword Extraction Based Peer Clustering", 2004, retrieved from <http://www.springerlink.com/content/ke75nggx60a9c8wg/fulltext.pdf>.*

Akyildiz, et al, "Wireless Mesh Networks: A Survey," Computer Networks, 2004, 43 pages.

Akyildiz, et al, "A Survey on Wireless Mesh Networks," IEEE Radio Communications, Sep. 2005, 8 pages.

Eagles, "Wireless Mesh Networks," iVolve Pty Ltd, Australia, Jan. 2007, 13 pages.

* cited by examiner

SYSTEM AND METHOD FOR MANAGING CONTENT INTEREST DATA USING PEER-TO-PEER LOGICAL MESH NETWORKS

BACKGROUND

Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

As more and more types of content appear on the Internet and via other network-accessible sources, it may become increasingly difficult for users to locate content they find interesting among all of the various potential sources. Conventionally, users may resort to search engines or random surfing of content to locate content. However, these techniques may be subject to trial and error and may not always be effective in yielding content of interest to users.

Figure 1:
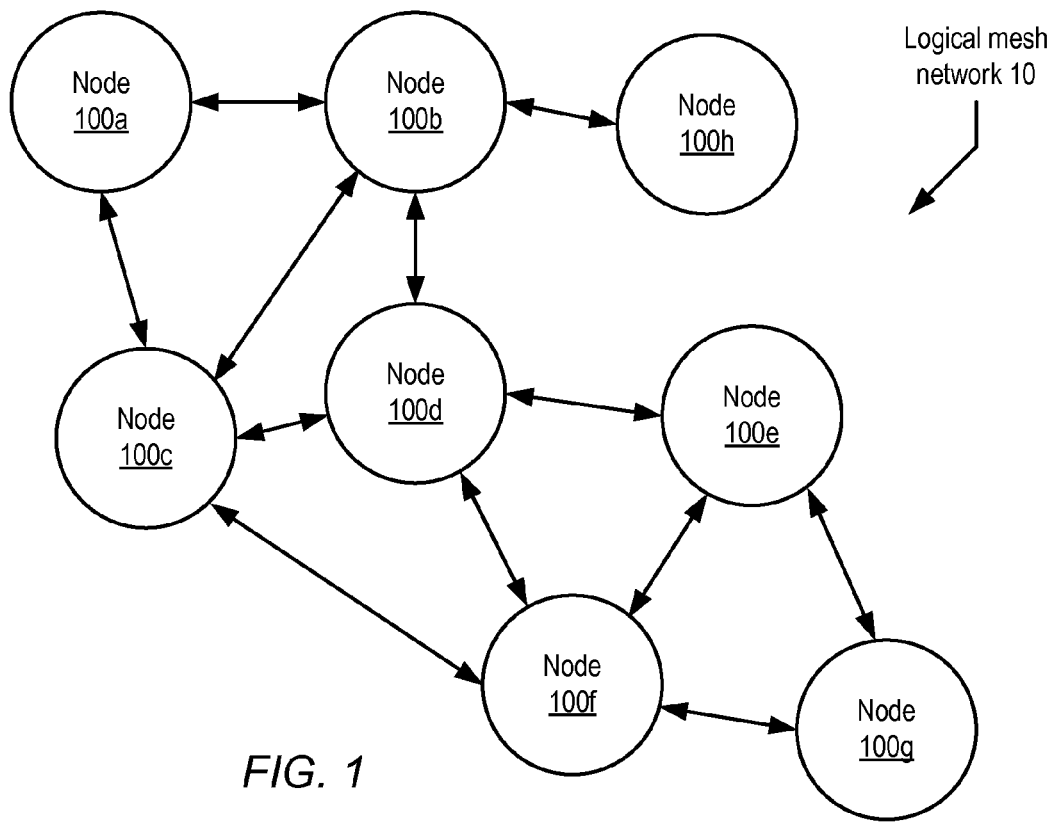
FIG. 1 is a block diagram illustrating one embodiment of a logical mesh network including a number of nodes.

While the present disclosure is described herein by way of example for several embodiments and illustrative drawings, those skilled in the art will recognize that the invention is not limited to the embodiments or drawings described. It should be understood, that the drawings and detailed description thereto are not intended to limit the claims to the particular form disclosed, but on the contrary, the intention is to cover all modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

As the costs of computing devices and communications between them have decreased, the types and quantity of information available to users of computing-based networks have increased markedly. The evolution of standard protocols for information exchange, such as TCP/IP, HTTP and similar or related protocols, has enabled users of numerous different types of computing devices to access increasingly sophisticated types of content. For example, users of personal computers, mobile phones, personal digital assistants (PDAs), integrated, multifunctional devices, or other suitable devices may access wired or wireless networks (e.g., connected to the public Intranet, private intranets, or other types of data networks) to access text, images, audio, and video data. Broadly speaking, data or information that a user may access via a networked computing device may be referred to as network-based content, or simply as content. Some examples of such content may include, without limitation, web pages hosted by web sites, electronic mail (email), blogs, instant messages, RSS feeds, streaming audio or video data, or combinations of these or other types of data.

As more network-based content becomes available, users may face increasing difficulty in identifying content in which they are interested while avoiding content that may be uninteresting or objectionable. By repeatedly indexing new and existing sources of content, search engines may render new content accessible to users. Users may then execute searches, such as keyword-based searches, to identify particular sources of content that are related in some fashion to the terms of the search. Alternatively, users may elect to "surf" content, navigating from one source of content to another on the assumption that links between content (e.g., links from one web page to another) may lead to other interesting content.

However, these techniques may suffer from various limitations. Both searching and surfing techniques for locating content rely on the user's own initiative and effectiveness in seeking out content. For example, the quality of a user's search results, in terms of how well those results match the user's interests, may depend on the user's own level of sophistication with respect to the search process. A naïve or inexperienced user may have difficulty locating desirable content on her own. The surfing approach may require the user to engage in trial and error, speculatively navigating to new content sources in the hopes that what he finds is worthwhile. Finally, once the user has expended effort to identify sources of content that are interesting, the results of that effort may be known only to that user. For example, the user may keep a local record of bookmarks, tags, links, or other references that the user has identified over time as corresponding to interesting sources of content. However, it may be difficult for other users to benefit from the efforts of a first user to identify content that might be interesting to a broader community of users.

In the following discussion, various embodiments of techniques and systems for enabling groups or communities of users to collaboratively identify and communicate regarding interesting content sources are explored. In particular, logical mesh networks configured to facilitate communication among users regarding content are described in detail. By participating in such logical mesh networks, individual users may be able to benefit from the collective efforts of a community in identifying and sharing interesting content. Collectively, a community of users interacting via a logical mesh network may be capable of filtering and discriminating among different types of content in sophisticated ways that may dynamically adapt to the changing nature of the available content and/or the changing or evolving interests of the participants.

First, a general overview of logical mesh networks and their possible implementations is provided. Next, techniques through which logical mesh networks may be dynamically reconfigured are discussed. Techniques for filtering messages in logical mesh networks are then described, and finally, an exemplary computer system embodiment is discussed.

Structure and General Operation of Logical Mesh Networks

One embodiment of a logical mesh network that includes a number of discrete nodes is illustrated in FIG. 1. In the illustrated embodiment, logical mesh network 10 (or simply, network 10) includes a number of logical nodes 100*a-h* (or simply, nodes 100*a-h*), which may be collectively or generically referred to as nodes 100 or a node 100. It is noted that the number of nodes 100 and their configuration within network 10 may vary in various embodiments. As described in greater detail below, nodes 100 within network 10 may be configured to share information regarding content that users of network 10 may find interesting or relevant to their needs.

In one embodiment, each node 100 may correspond to a respective user of network-based content. Collectively, network 10 may represent a community of users, each represented by a corresponding node 100. In various embodiments, individual nodes 100 may be implemented via hardware or a suitable combination of hardware and software (e.g., as program instructions executing on one or more processors). For example, the functionality of node 100 as described below may be implemented as hardwired or embedded functionality within a dedicated or special-purpose device that is configured to communicate with other devices. Alternatively, the functionality of node 100 may be implemented as an application program configured to execute on a general-purpose computer, such as a computer configured to execute a suitable version of the Microsoft Windows™ operating system, the Apple MacOS™ operating system, or a suitable variant of the Unix™ or Linux operating systems, for example.

In embodiments where the functionality of node 100 is implemented via software, it is contemplated that node 100 may variously be implemented as a standalone application configured to execute within an execution environment provided by an operating system, as a browser-based application configured to execute within an execution environment provided by a web browser (e.g., as a widget, badge, applet, browser toolbar, etc.) or using any other suitable implementation techniques or software architectures. In various embodiments, there may exist a one-to-one or many-to-one correspondence between nodes 100 and the devices that implement them. For example, in a software implementation, it is possible that multiple instances of an application may be executed on the same multiuser system (e.g., a server system) to implement a number of nodes 100. By contrast, an embedded, portable, or handheld device may be configured to operate as a single node 100 on behalf of a single user.

As described in greater detail below, nodes 100 may be configured to communicate with one another regarding content with which the users of nodes 100 interact. Generally speaking, to implement such communication, nodes 100 may be configured to implement peer-to-peer message passing with one another. In one embodiment, each given node 100 may be configured to maintain an indication of those other nodes 100 within network 10 that are the given node's peers (e.g., within a table or other suitable data structure). For example, with respect to the embodiment of FIG. 1, node 100*a* may indicate nodes 100*b-c* as peers, node 100*d* may indicate nodes 100*b-c* and 100*e-f* as peers, etc. In one such embodiment, each node 100 may be configured to communicate only with its peers within network 10. For example, if node 100*a* generates a message or receives a message from another node to be forwarded, it may convey that message only to its peer nodes 100*b-c*. Through successive iterations of message passing among nodes 100, it is possible for a given message to propagate among all the nodes 100 within network 10 without any particular node 100 needing to be aware of the entire state or scope of network 10. That is, in some embodiments, the connectivity of network 10 may be entirely distributed such that no single central server or entity is aware of the entire state of network 10. However, in other embodiments, it is contemplated that nodes 100 may be configured to maintain representations of some or all of network 10, even though such nodes 100 may confine their message to peer nodes 100 within network 10.

It is noted that as a logical mesh network, the relationships among nodes 100 within network 10 bear no necessary correspondence to physical relationships that may exist among nodes 100. That is, nodes 100 that are configured as logical peers within network 10 are logically proximate within the network, but may be physically distant. Moreover, nodes 100 that are configured as logical peers 100 may directly exchange messages with one another without such messages passing through another node 100, but messages exchanged by peer nodes 100 may pass through other devices. For example, in one embodiment, logical mesh network 10 may be implemented by a number of instances of software clients implementing nodes 100 and which execute on computer systems or devices that are themselves physically networked. In such an embodiment, the systems on which nodes 100 execute may be interconnected via a local area network (LAN), a wide area network (WAN), the public Internet, or any other suitable type of network, and may exhibit connectivity that differs substantially from the logical mesh connectivity among nodes 100 indicated by network 10. Thus, communications between peer nodes 100 that are implemented via other systems may exhibit varying degrees of latency and bandwidth according to the underlying network and physical protocols that may be employed to implement such communication.

Put another way, logical mesh networks such as network 10, in which peer relationships bear no necessary correlation to the routing of data between nodes 100, are distinct from physical mesh networks in which peer relationships between nodes necessarily imply the ability of the nodes to route data to one another. That is, peer nodes 100 in a logical mesh network may be aware of their relationship as peers but delegate the task of routing information between them to a separate entity or layer of functionality. By contrast, peer nodes within a physical mesh network are defined in terms of their ability to route information between one another at the network level. In one embodiment, logical mesh networks may be implemented at the session, presentation or application layers of the Open Systems Interconnection (OSI) reference model for network protocol design (e.g., OSI host layers 5-7). By contrast, physical mesh networks are implemented at the OSI media layers, such as the network level (OSI media layer 3). For example, a physical mesh network may be implemented using switched packets routed according to the Internet Protocol (IP).

While the relationships among nodes 100 within network 10 need not correspond to underlying physical or other lower-level relationships among nodes 100, such a correspondence is not prohibited. For example, it is possible in some embodiments that nodes 100 that are logical peers with respect to network 10 may also be physical peers with respect to an underlying network.

The initial configuration of nodes 100 within network 10 may be derived in any suitable fashion. In some embodiments, a user corresponding to a particular node 100 may join a network 10 by explicitly specifying one or more peer nodes 100 to which the user wishes to be connected via network 10. For example, nodes 100 may be distinguished by identifiers corresponding to their respective users, such as usernames, email addresses, or other suitable identifiers. To establish a relationship with various peer nodes 100, a given user may specify the identifiers of users corresponding to the desired peer nodes 100. Alternatively, a given node 100 may be configured to identify potential peer nodes 100 on the basis of other networks or relationships to which the given node's corresponding user belongs. For example, an application configured to implement the functionality of given node 100 may be configured to identify peer nodes 100 dependent on a user's contacts (e.g., as reflected in an email application, address book, contact manager, or other similar application), membership in a social network (e.g., as reflected by social networking sites or tools such as Facebook or Myspace), membership in a common organization (e.g., a common employer, school, etc.) or on any other suitable basis. In some embodiments, initially establishing a peer relationship between two nodes 100 may be dependent on the consent of one or both users corresponding to those nodes 100. For example, an application implementing node functionality may be configured to present an interactive user interface such as a dialog box or other prompt through which a user may influence node behavior. In other embodiments, nodes 100 may be configured to take autonomous actions without dependence on user approval.

Figure 2:
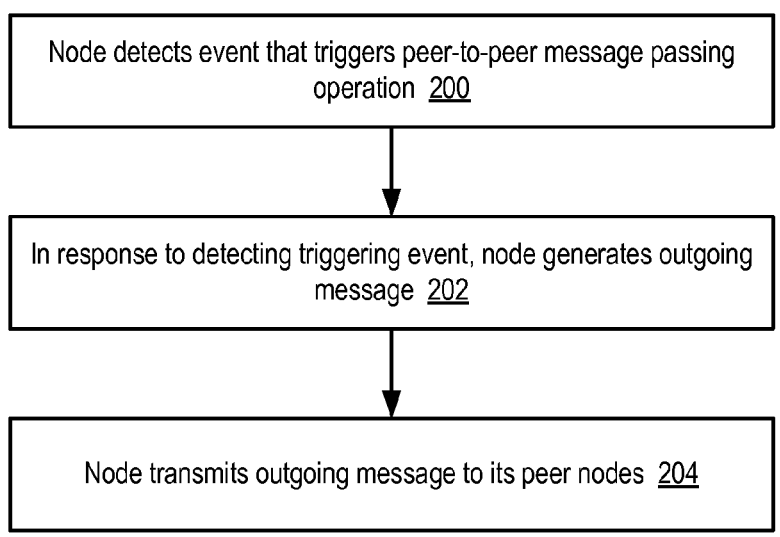
FIG. 2 is a flow diagram illustrating one embodiment of a method of a node sending a message to peer nodes in a logical mesh network.

FIG. 2 illustrates one embodiment of a method of operation in which a given node 100 may convey a message regarding content to its peer nodes 100. In the illustrated embodiment, operation begins in block 200 where the given node 100 detects an event that triggers the peer-to-peer message passing operation. In one embodiment, nodes 100 may support two different types of triggering events, although other configurations supporting other types of triggering events are possible and contemplated.

One type of triggering event may occur when the given node 100 receives a message from a peer node 100. In addition to processing the received message, e.g., as described below with respect to FIG. 4, the given node 100 may be configured to forward the received message to its peers, such that the message may eventually be propagated throughout network 10. As described in greater detail below, in some embodiments, whether receipt of a particular message by a node 100 triggers forwarding of that message to other nodes 100 may depend on any of a number of criteria. That is, forwarding may be performed contingently rather than unconditionally. For the purposes of understanding FIG. 2, however, it will be assumed that any applicable conditions precedent to forwarding a received message have been satisfied.

Another type of triggering event may occur when the given node 100 generates a new message to be conveyed to peers of the given node 100. That is, the given node 100 may originate a particular message instead of forwarding it from another node 100. In one embodiment, generation of a new message may occur in response to a user's interaction with the given node 100. For example, as described above, in one embodiment an application or device that implements the functionality of the given node 100 may present an interactive user interface to a user associated with the given node 100. Using such an interface, the user may signal the given node 100 regarding content for which a message should be sent to the given node's peers. For example, a user viewing a particular web page may select a button or other input feature of a browser-based toolbar, widget, or other implementation of given node 100, in response to which the given node 100 may generate a message corresponding to the particular web page as described below.

In some embodiments, a given node 100 may be configured to recognize a variety of different types of content from the context in which the user interacts with the content. For example, the given node 100 may be configured to recognize web pages, email messages, images, audio or video objects by interacting with the application(s) (e.g., web browsers, email clients, media players, etc.) with which the user uses or manipulates the content. In some such embodiments, the given node 100 may be configured to recognize content and generate corresponding messages to be conveyed to peer nodes 100 without user interaction. For example, the given node 100 may be configured to monitor sources of content such as email, RSS feeds, or other "push" types of content. When new content arrives, the given node 100 may convey messages regarding the content to peer nodes 100 without dependence on whether a user indicates that such messages should be sent. As mentioned above in the case of message forwarding, in some embodiments, whether the given node 100 automatically conveys a message to peer nodes 100 regarding new content may depend on whether various criteria are satisfied. For example, as described in greater detail below, the given node 100 may apply various keyword or other types of filters to the content to determine whether peer nodes 100 should be notified about it.

Generation of a new message to be sent by a given node 100 to its peer nodes 100 may be triggered in other ways, in various embodiments. For example, the given node 100 may be configured to generate such a message each time a user navigates to a new source of content within a browser (e.g., when the user clicks on a link, selects a bookmark, enters a Uniform Resource Locator (URL) or Uniform Resource Identifier (URI), or performs another sort of navigation operation). In some embodiments, message generation in response to user navigation may be contingent upon whether the navigation activity satisfies various criteria. For example, messages may be generated for some types of navigation activity, or for some types of content sources navigated to, but not others. In an alternative embodiment, a given node 100 may be configured to generate, at periodic intervals, a message indicative of whatever content the user happens to be viewing or interacting with at the time the message is generated. In such an embodiment, the message may be generated automatically, without action on the part of the user, although as mentioned above with respect to other embodiments, such message generation may be contingent upon predetermined criteria.

While some embodiments of nodes 100 may be highly automated and/or tightly integrated with content, such as described above, in other embodiments, nodes 100 may be less complex. For example, in one embodiment, a given node 100 may be configured to originate messages only for content that a user explicitly provides, e.g., by manually entering the content into an interface provided by the given node 100, by dragging and dropping a content object onto such an interface, or via other suitable techniques. It is contemplated that in some embodiments of network 10, different nodes 100 may be implemented with different degrees of functionality. For example, some nodes 100 (e.g., those hosted by fully-featured computing devices) may support sophisticated user interfaces and/or content monitoring functions, while other nodes 100 (e.g., those hosted by embedded or mobile devices having fewer computing resources) may support fewer features with respect to user interfacing and/or content.

Figure 3:
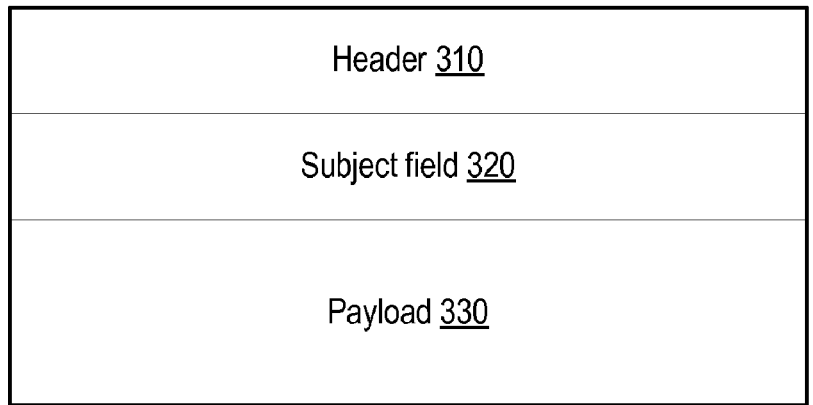
FIG. 3 is a block diagram illustrating one embodiment of a message.

In response to detecting a triggering event (whether resulting from a received message, generated locally by the given node 100, or otherwise), the given node 100 may then generate an outgoing message (block 202). One embodiment of such a message is shown in FIG. 3. In the illustrated embodiment, message 300 includes a header 310, a subject field 320, and a payload 330, although in other embodiments message 300 may include additional or different portions configured in any suitable fashion. In various embodiments, message 300 may be formatted according to any suitable language or messaging standard. For example, message 300 may be formatted in Hypertext Markup Language (HTML), eXtensible Markup Language (XML), or another suitable markup language or messaging protocol. Message encapsulation or metalanguage techniques, such as the SOAP protocol, may also be used in certain embodiments.

Generally speaking, header 310 may be configured to indicate the origin and/or transmission history of the message 300. In various embodiments, header 310 may include information identifying the node(s) 100 at which a particular message 300 originated and/or the nodes 100 through which the particular message 300 passed to arrive at a given node 100. For example, as noted above, in various embodiments each node 100 may be associated with a respective unique identifier, such as a tag or name within a namespace that is specific to network 10, a URL or URI, an IP address, an IP address in combination with a specific port number, or any other suitable type of identifier. Correspondingly, the identifier of the originating node 100 and/or intermediate nodes 100 may be encoded within header 310 in any suitable format. In some embodiments, nodes 100 may be configured to preserve a complete transmission history for each message 300 that indicates all nodes 100 through which the message 300 passed, including the originating node 100. In other embodiments, only limited transmission history may be preserved within header 310. For example, the originating node 100 may be omitted, and/or the history may be limited to a fixed number of nodes 100 through which the message 300 most recently passed.

In some embodiments, it is contemplated that when a given node 100 forwards a received message 300 to its peer nodes 100, the given node 100 may record its own identifier within the header 310 of the received message 300 prior to forwarding it. In other embodiments, the identity of the given node 100 may be implied rather than recorded within message 300. For example, as part of the process of receiving a message 300 from the given node 100, its peer nodes 100 may recognize that the message 300 was conveyed from the given node 100, e.g., as reflected in the protocol employed to transmit messages between the nodes 100. In some such embodiments, peer nodes 100 that receive a message 300 from a given node 100 may update the transmission history of header 310 upon receipt of the message 300 to reflect that the message passed through the given node 100. That is, in some embodiments, transmission history may be updated by the receiver of a message 300 rather than the transmitter.

Subject field 320 may be configured to store information indicative of the content to which a given message 300 corresponds. Such information may be generally referred to as indicia of content. For example, subject field 320 may include a name or phrase associated with the content, such as a title assigned to the content by its creator (e.g., a headline, a subject line of an email message, a title of a web page or blog post, a file name, or any other type of term or phrase).

Subject field 320 may also include keywords that are descriptive of the content to which a given message 300 corresponds. In one embodiment, such keywords may be free-form, in that any suitable words may be employed as keywords. In another embodiment, such keywords may be constrained to be selected from a limited set of possible keywords. For example, the keywords may be chosen from an ontology that defines categories into which content may be classified. In one such embodiment, the keywords associated with content may include a partial or complete list of hierarchical categories into which a given content item has been classified. As an example, one such ontology may include the categories "recreational activities," "outdoor activities," "fishing," and "fresh water fishing," each of which hierarchically includes the next. In this example, a content item that is identified as having to do with fresh water fishing may be explicitly or implicitly associated with each of these categories as keywords within subject field 320.

In one embodiment, the node 100 from which a given message 300 originates may be responsible for generating the contents of subject field 320. For example, the originating node 100 may prompt a user to supply keyword or title information, or may examine the content or interact with another entity (e.g., the source of the content) to ascertain such information. In other embodiments, generation of subject field 320 may be delegated to an agent or entity external to nodes 100. Various combinations of the types of information included in subject field 320 and the manner in which it is generated are possible and contemplated. For example, both keyword and title information may be included as subfields within subject field 320. In some embodiments, quantitative techniques may be employed instead of or in addition to lexical techniques to indicate or summarize content within subject field 320.

Payload 330 may, in various embodiments, include the entirety of the content to which a message 300 refers or corresponds, an abstract or digest of that content, a reference or pointer to a source of that content, or any combination of these. In some embodiments, the type of information included within payload 330 may depend upon the type and/or size of the content item to which the message 300 corresponds. For example, if a message 300 corresponds to an email message, a text-based document, or an image, the entirety of these items may be included within the payload 330 of the message 300. By contrast, if a message 300 corresponds to a large or complex item, such as a large multimedia document or a web page, the item may be summarized such that less than all of its content is included within payload 330. For example, text portions of a multimedia document may be retained, while images or other elements might be excluded. A reference indicating where the item may be found in its entirety, such as a URI, may also be included within payload 330 in addition to or instead of the content or a summary.

Once the outgoing message has been generated, the given node 100 may transmit the outgoing message to its peer nodes 100 (block 204). For example, as mentioned previously, nodes 100 may be configured to store and maintain local data structures (e.g., tables, lists, etc.) that indicate the identities of their peer nodes 100 within network 10. The given node 100 may reference such a data structure and initiate an appropriate protocol operation to convey the outgoing message to its peer nodes 100. For example, in one embodiment, communication from one peer node 100 to another may be implemented via HTTP commands (e.g., PUT/GET) directed to a URI corresponding to the destination node 100. However, in other embodiments, any suitable messaging or transport protocol or combination of such protocols may be employed, using any suitable type of namespace with which to distinguish nodes 100.

In some embodiments, transmission of outgoing messages 300 to peer nodes 100 may be queued and retried if initially unsuccessful. For example, it may be the case that a particular node 100 of network 10 is temporarily offline or unavailable. In one embodiment, nodes 100 may queue outgoing messages 300 that cannot be immediately delivered to peer nodes 100. Nodes 100 may occasionally retry delivery of queued messages 300. Alternatively, nodes 100 may be configured such that they occasionally poll their peer nodes 100 (e.g., after having been offline) to determine whether any queued messages 300 are waiting to be delivered. A combination of retry (by sending nodes 100) and polling (by receiving nodes 100) may also be employed. In an alternative embodiment, message delivery may be implemented in a lossy fashion in which only a certain number of delivery attempts may be made, after which delivery may be abandoned. In networks 10 where there exist multiple redundant paths for message transfer among nodes 100, lossy message delivery may still result in substantially all messages 300 being delivered to their intended destinations.

Figure 4:
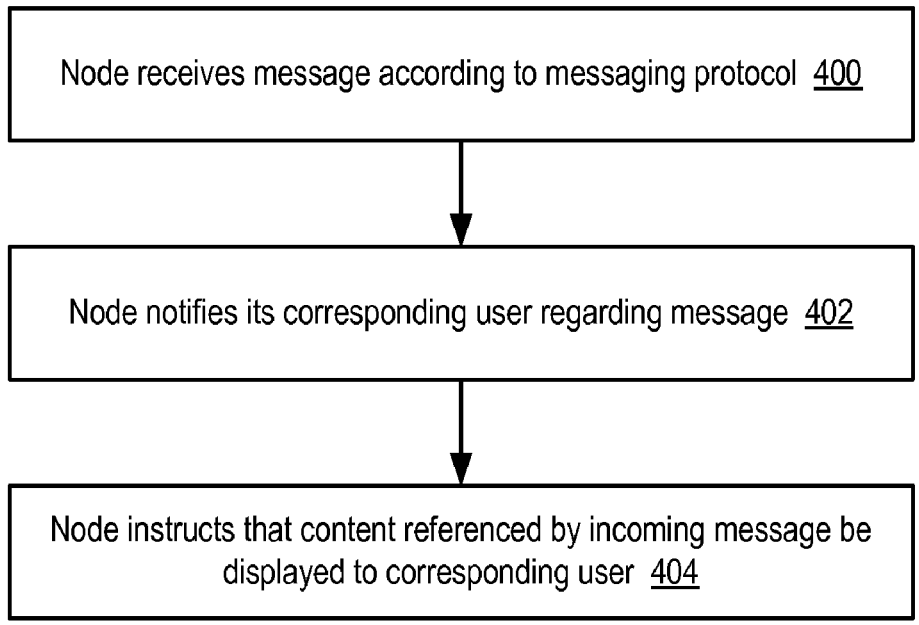
FIG. 4 is a flow diagram illustrating one embodiment of a method of a node receiving a message from a peer node in a logical mesh network.

FIG. 4 illustrates one embodiment of a method of operation in which a given node 100 may receive a message regarding content from one of its peer nodes 100. In the illustrated embodiment, operation begins in block 400 where a message 300 is received according to a messaging protocol. For example, as noted above, the given node 100 may receive an HTTP command along with the various components of message 300.

After receiving the message 300, the given node 100 may notify its corresponding user (block 402). For example, the given node 100 may provide a visual or audible notification indicative of message arrival to a user via a user interface. In some embodiments, the given node 100 may be configured to notify a user regarding a message received from a peer node 100 through other forms of communication, such as by sending an email message, an instant message or an SMS/text message to an appropriate message client associated with the user.

The given node 100 may also instruct that the content referenced by the incoming message 300 be displayed to the user (block 404). For example, if the message payload 330 includes text or image data, the given node 100 may instruct that the data be extracted from the message 300 and displayed to the user, either via display functionality native to the given node 100 or by invoking another application to perform the display. If the message payload 330 includes a reference to a content item located elsewhere, such as a URL or URI, the given node 100 may be configured to instruct that the referenced item be obtained and displayed to the user. For example, the given node 100 may be configured to instruct a browser application to retrieve and display the referenced item. In some embodiments, the display of content reference by the incoming message 300 may be dependent upon user approval. For example, the given node 100 may be configured to queue incoming messages 300 and cause them to be displayed only upon request of the user.

In some embodiments, in addition to or instead of displaying such content to the user, the given node 100 may be configured to persistently store an indication of the received content for later use by the user. For example, if an incoming message 300 includes a link or URL/URI referencing content, the given node 100 may be configured to store the link in a list of bookmarks maintained on behalf of the user. In some embodiments, such storage may be performed contingently dependent upon the user's approval. Alternatively, the given node 100 may be configured to store such references in a list or location that is distinct from references that were manually selected by the user. Later, the user may choose to merge or combine references from the former list into the latter.

Broadly speaking, through use of the above-described techniques or suitable variants thereof, a community of users joined via a network 10 may be able to generate and distribute messages among one another that are indicative of their individual experiences with various types of content. Such collaboration may increase the likelihood that individual users will locate content they find interesting, since users may rely on notifications of the experiences of other users within network 10 in addition to their own experiences in seeking out content.

Logical Mesh Network Reconfiguration

Based on the above, a given node 100 that corresponds to a particular user may receive a variety of messages 300 about a variety of different types of content. Some of these messages may reflect content that is more interesting to a user of the given node 100 than the content reflected by other messages. For example, the given node 100 may receive some messages 300 that are related to fishing, others related to cooking, and still others related to cars. Depending on the interests and preferences of the user of given node 100, the user might wish to receive more of some types of messages and fewer of others.

In one embodiment, a given node 100 within network 10 may be configured to change its peer configuration within network 10 in response to the messages 300 it receives from other nodes 100. For example, the given node 100 may be configured to establish a connection within network 10 with a node 100 that is not currently its peer, and/or to drop a connection with a current peer node 100, dependent upon how well messages 300 that are received from the nodes 100 to be added or deleted match the interests of the user of the given node 100. Referring to the embodiment of network 10 shown in FIG. 1, suppose for example that node 100e determines that the majority of messages 300 that are received from node 100d and are of interest to node 100e's user passed through or originated from node 100b (e.g., as indicated in their transmission history). In one embodiment, based on this information, node 100e may seek to drop its connection to node 100d and add node 100b as a peer, on the assumption that node 100b provides more interesting content.

Figure 5:
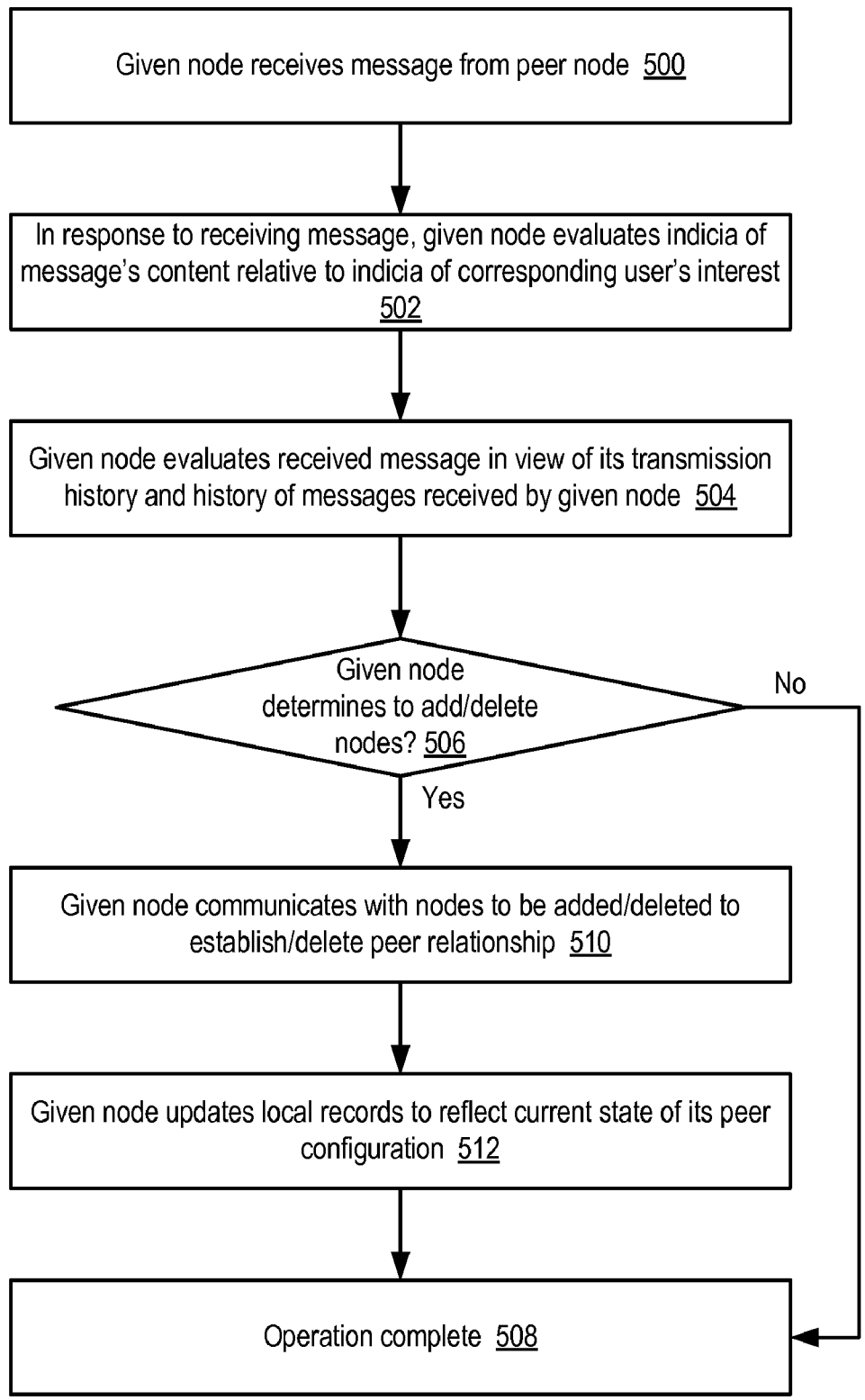
FIG. 5 is a flow diagram illustrating one embodiment of a method of a node reconfiguring its peer node configuration within a logical mesh network.

One embodiment of a method of operation in which a given node 100 may reconfigure its peer node configuration within network 10 in response to a message 300 received from a peer node 100 is illustrated in FIG. 5. In the illustrated embodiment, operation begins in block 500 where the given node 100 receives a message 300 from a peer node 100. Referring to the example cited in the previous paragraph, node 100e may receive a message 300 transmitted by a peer node 100d. (It is noted that in some embodiments, a given node 100 may take a variety of actions in response to receiving a message 300. For example, it may forward the received message as described above with respect to FIG. 2 in addition to performing the actions described below.)

In response to receiving the message 300, the given node 100 may be configured to evaluate indicia of the message's content relative to indicia of the user's interest (block 502). In one embodiment, the given node 100 may be configured to compare keywords or other information included in the message's subject field 320 with keywords or other information that are indicative of the interests of the user of the given node 100. For example, the given node 100 may support an interface through which its corresponding user identifies content he or she finds interesting. Such an interface may allow the user to specify particular keywords, topics, or categories, which may be stored by given node 100. Alternatively, indicia of content interest may be derived from content the user designates as being interesting. For example, a user may indicate to the given node 100 that a particular web page, image, document, or other source of content is interesting, without specifying further details. The given node 100 may then (either natively or with the assistance of other applications) extract indicia of interest from the content source. For example, the content source may be scanned to generate keywords, or other sources of information (e.g., search engines) may be consulted to obtain keywords, tags, or other types of metadata that may have previously been identified with respect to the content source. Generally speaking, nodes 100 may employ any suitable technique for generating and/or representing user interests.

In an embodiment in which keywords are used as the primary indicia of message content and user interest, evaluating a message 300 relative to the interests of the user of the given node 100 may include determining how many of the message's keywords (e.g., as indicated in subject field 320) match the keywords indicative of the user's interests. In embodiments where the keywords reflect a hierarchy of semantic categories (e.g., as in the "fresh water fishing" example mentioned above), evaluating a message 300 may include determining how many levels of the hierarchy match between the message 300 and the user's interests. It is contemplated that any other suitable techniques for measuring similarity between the content included in or referred to by a message 300 and the interests of a user of a given node 100 may be employed. For example, statistical techniques (e.g., Bayesian filters), or hash/signature analysis may be employed instead of or in addition to keyword matching.

In one embodiment, evaluating the content indicia a message 300 relative to indicia of the user's interest may produce a binary indication of whether the message 300 is interesting or not interesting. For example, a threshold may be applied to the number of keywords matched, the output of the Bayesian analysis, or the result of another similarity detection technique. If the result of the evaluation satisfies the threshold, the message 300 may be deemed interesting. In another embodiment, the evaluation may result in an indication of the degree or quality of the match between the message's content indicia and the user's interests. For example, the evaluation may produce a result on a scale of 0-10, where higher numbers indicate higher similarity, and correspondingly a higher degree of user interest.

The given node 100 may also evaluate the received message 300 in view of its transmission history and the history of prior messages 300 received by the given node 100 (block 504). For example, the transmission history of a message received by node 100*e* from node 100*d* may indicate that the message previously passed through node 100*b*. In one embodiment, the given node 100 may maintain an interest metric for each of the nodes 100 from which it receives messages 300, including those nodes 100 indicated in a message's transmission history. In one embodiment, the interest metric may indicate the cumulative frequency or history with which interesting messages have arrived, directly or indirectly, from a corresponding node 100. For example, if a particular message 300 is deemed to be interesting, or if its degree of interest (e.g., according to a scale or range) satisfies a threshold value, the given node 100 may be configured to increment or augment the history metric associated with each node 100 that is reflected in the transmission history of the particular message 300. In the case of the example message received by node 100*e* via nodes 100*d* and 100*b*, if the message is determined to be interesting as described above, node 100*e* may be configured to increment interest metrics associated with each of nodes 100*b* and 100*d* to reflect the effect of the received message.

Numerous techniques by which a given node 100 may aggregate the effects of individual message 300 into cumulative or historical interest metrics are possible and contemplated. For example, the interest metric associated with a particular node 100 may be decremented if an uninteresting message 300 is received from the particular node 100. In one embodiment, the interest metric for a node 100 may decay over time independently of whether an interesting or uninteresting message is received from that node 100. In another embodiment, instead of maintaining a single global interest metric for each other node 100, the given node 100 may maintain a list or vector of values (e.g., corresponding to some number of messages 300 most recently received by the given node 100). In yet another embodiment, when a given node 100 receives a message that passed through a particular node 100, the degree to which the particular node's interest metric is adjusted may depend on the degree of separation between the given node 100 and the particular node 100. For example, when node 100*e* receives a message from node 100*b* via node 100*d*, it may adjust interest metrics for nodes 100*b* and 100*d* differently (e.g., adjusting node 100*d* by a greater magnitude than 100*b*) based on the fact that node 100*d* is a peer node and node 100*b* is not. Generally speaking, the interest metric determined for one node 100 by another node 100 may be any suitable global or cumulative value or set of values that are indicative of the history and relative interest level of messages 300 from the first node 100 received by the second node 100.

Dependent upon the history and relative interest level of messages 300 received from other nodes 100, the given node 100 may determine whether to add and/or delete other nodes 100 as peer nodes 100 (block 506). For example, node 100*e* may evaluate the interest metrics associated with nodes 100*b* and 100*d*, and may determine that even though node 100*b* is not currently a peer node, its interest metric may justify adding node 100*b* as a peer node, and possibly removing node 100*d* as a peer node.

In various embodiments, a number of factors may influence the given node's decision as to whether to alter its peer node configuration, and if so, in what manner. The decision to alter peer configuration may be a function of one or more of the most recently received messages 300 (e.g., the degree to which message indicia match user interests), the interest metrics associated with the various nodes 100 in the transmission history of the most recently received message(s) 300, and/or the relative proximity of those various nodes 100 to the given node 100. These factors may be weighted differently in different embodiments. For example, in one embodiment, the given node 100 may be biased to favor peer nodes 100 that are closer to the originating nodes 100 of interesting messages. That is, the given node 100 may be biased to favor peer nodes 100 that are farther "upstream," relative to the source of interesting messages. Thus, if other factors (e.g., interest metrics) are equal between nodes 100*b* and 100*d*, node 100*e* may prefer to have node 100*b* as a peer. Depending on the degree to which the aforementioned factors are weighted, in some instances, upstream nodes 100 may even be favored over certain current peer nodes 100 that have higher interest metrics than the upstream nodes 100.

In some instances, a received message 300 may include more comprehensive transmission history information than just the two nodes 100 that most recently transmitted the message 300 prior to its receipt by the given node 100. For example, messages 300 may include a larger, fixed number of the last nodes 100 to transmit them, or may include complete transmission histories reflecting the originating node 100 and all intermediate nodes 100. Thus, when determining whether to alter its peer node configuration, in some embodiments the given node 100 may consider nodes 100 that are separated from the given node 100 by more than one intervening node 100. Referring to the previous example, the message 300 arriving at node 100*e* via nodes 100*b* and 100*d* may have originated at node 100*a*, and its transmission history may reflect this. Consequently, when evaluating whether to alter its peer configuration, node 100*e* may consider establishing a direct peer relationship with node 100*a* instead of or in addition to node 100*b*.

Various implementation factors may influence how far upstream with respect to a transmission history path the given node 100 may look when determining whether to add new peer node(s) 100. In some embodiments, the number of degrees of separation between the given node 100 and the new peer node 100 may be analogized to the iteration step size in an iterative optimization or goal-seeking process. A larger step size (e.g., greater number of degrees of separation) may result in faster convergence to a desired result (e.g., in this case, increasing the number of interesting messages 300 that the given node 100 receives). However, in some instances, a larger step size may result in overshoot or failure to converge (e.g., hunting oscillations or instability). Conversely, a smaller step size may increase the likelihood that convergence to a desired result is achieved, though a larger number of iterations may be required. In some embodiments, the number of degrees of separation between the given node 100 and the new peer node 100 may vary depending on the number of degrees of separation between the given node 100 and the node at which the message under consideration originated. For example, if the given node 100 and the originating node 100 are separated by many intermediate nodes 100, a new peer node 100 that is correspondingly farther upstream may be selected. Conversely, if the given node 100 and the originating node 100 are closer together, a new peer node 100 that is comparatively closer to the given node 100 may be selected.

When the given node 100 identifies a new peer node 100 to be added, in some embodiments it may add the new peer node 100 without deleting any existing peer nodes 100. However, in other embodiments, nodes 100 may be limited in the number of peers they may support (e.g., to prevent message processing overhead from becoming unbounded). In one such embodiment, the given node 100 may be configured to swap an existing peer node 100 for the new peer node 100 to be added. For example, node 100*e* may elect to swap node 100*b* for node 100*d*, by effectively deleting its connection to node 100*d* and adding a connection to node 100*b*.

Figure 6:
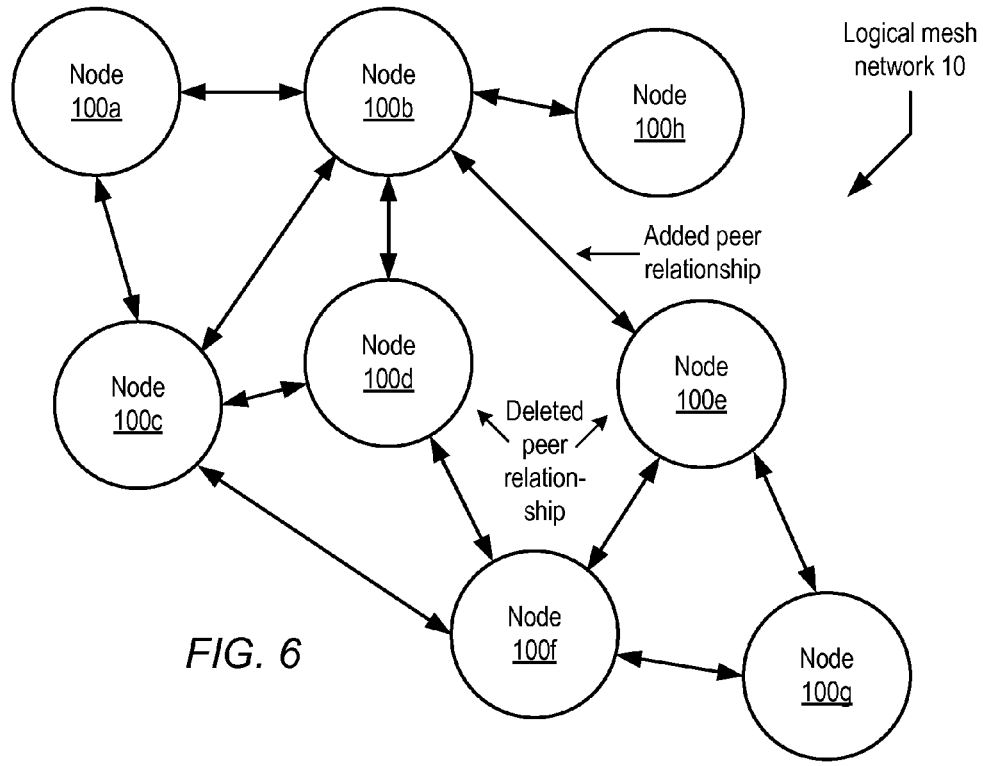
FIG. 6 is a block diagram illustrating one embodiment of a logical mesh network following reconfiguration.

If the given node 100 determines not to change its configuration of peer nodes, operation may be complete (block 508). If the given node 100 determines that other nodes 100 should be added or removed as peers, the given node 100 may communicate with those other nodes 100 to establish or delete the peer relationship(s) (block 510). The given node 100 may also update its local records to reflect the current state of its peer configuration (block 512). One example illustrating the network 10 of FIG. 1 after node 100*e* has reconfigured its peers to add node 100*b* and delete node 100*d* is shown in FIG. 6.

It is noted that the logical mesh network reconfiguration process described above need not necessarily occur in response to receiving any particular message 300, although in some embodiments, node state information may be updated and reconfiguration opportunities may be analyzed each time a message 300 arrives at the given node 100. In some embodiments, the process of updating interest metrics and/or other state information may occur separately from the process of analyzing reconfiguration opportunities. For example, updating state information may occur whenever messages arrive, but reconfiguration may occur only at defined intervals or points in time, or when particular events occur (e.g., after a certain number of messages 300 have arrived since the last reconfiguration analysis).

Using the above-described techniques, it is contemplated that the configuration of network 10 may evolve dynamically in response to the behavior of the users of the various nodes 100, via the messages 300 that may result directly or indirectly from user behavior. In particular, it is contemplated that various nodes 100 may seek to change their peer node configurations in a manner that increases their proximity to other nodes 100 that originate messages 300 that are interesting to the users of the various nodes 100. By increasing proximity in this fashion, nodes 100 may be able to increase the number and kinds of messages 300 that are interesting, while leveraging the collaborative efforts of a number of users to do so.

Message Filtering in Logical Mesh Networks

As described above, sharing of messages 300 within network 10 may increase the likelihood that various nodes 100 are notified about interesting content that users of those nodes 100 might not individually find. However, nodes in peer-to-peer networks such as network 10 may spend a substantial fraction of their message-related processing time forwarding messages received from other nodes. Correspondingly, in some embodiments, nodes 100 may be configured to forward (and in some instances, to generate) messages 300 conditionally rather than unconditionally. Generally speaking, the conditional forwarding and/or generation of messages 300 may be referred to as message filtering.

Figure 7:
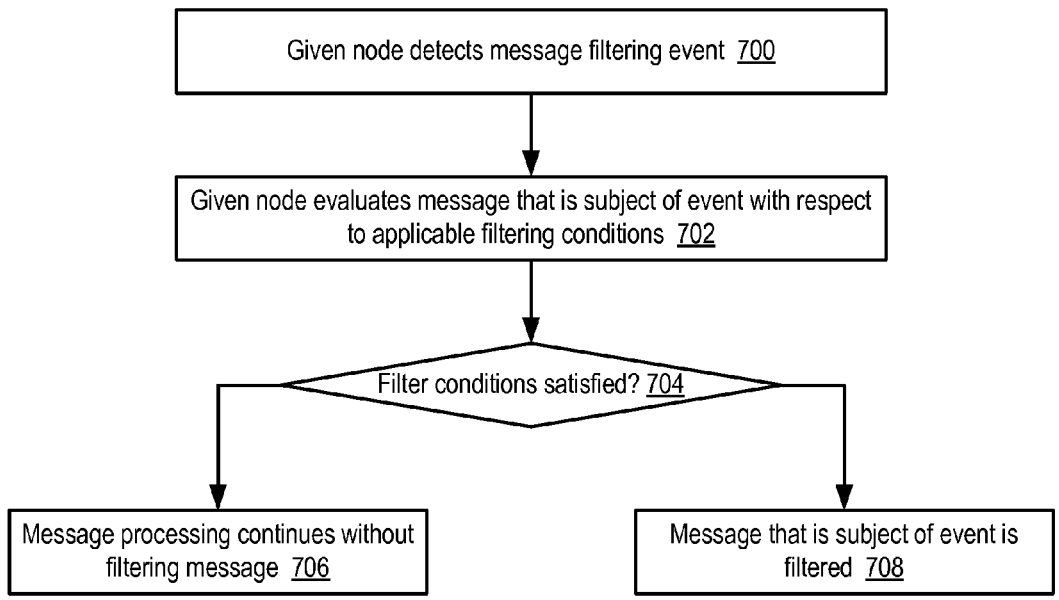
FIG. 7 is a flow diagram illustrating one embodiment of a method of a node filtering messages.

One embodiment of a method of operation in which a given node 100 may filter messages 300 is illustrated in FIG. 7. In the illustrated embodiment, operation begins in block 700 where a message filtering event is detected. It is contemplated that in some embodiments, the method shown in FIG. 7, or a portion or suitable variant thereof, may be used in conjunction with the method of conveying a message 300 to a peer node 100 described above with respect to FIG. 2, or a suitable variant thereof. Thus, for example, a message filtering event may correspond to the same type of event that triggers the peer-to-peer message passing operation, such as the arrival of a message 300 at the given node 100. It is contemplated that filtering operations such as the ones described with respect to FIG. 7 may constitute conditions precedent to forwarding a received message, as mentioned above with respect to FIG. 2. That is, in some embodiments, satisfaction of filtering conditions may be a necessary condition to forwarding a message 300. It is also contemplated that message filtering may be applied to the generation of a message 300 at an originating node 100.

In response to detecting the message filtering event, the message 300 may be evaluated with respect to applicable filter conditions (block 702). In one embodiment, evaluating filter conditions for forwarding a message 300 may include evaluating indicia of the message's content relative to indicia of the interest of the user of the given node 100. In one such embodiment, any of the techniques for evaluating such indicia as described above with respect to block 502 of FIG. 5 (describing interest-based reconfiguration of a node's peer configuration) may be employed. For example, keywords included within the subject field 320 may be compared against keywords associated with the interests of the user of the given node 100. Alternatively, any other technique for determining the similarity of message content indicia to user interest indicia may be employed.

In some embodiments, the filter conditions may not have anything to do with indicia of message content. In one embodiment, a given message 300 may include a hop count field (e.g., within header 310) that is configured to limit the number of times the given message 300 may be forwarded. For example, the originating node 100 of the given message 300 may be configured to set the hop count to a particular value, and it may be subsequently decremented by each node 100 that forwards the given message 300. In another embodiment, the filter conditions may include loop detection, for example by examining the transmission history of a given message 300 to determine whether the given node 100 previously received the given message 300.

The given node 100 may then determine whether the applicable filter conditions are satisfied (block 704). In various embodiments, this determination may depend on the nature of the filter conditions. For example, some filter conditions (such as those based on hop counts or loop detection) may be either satisfied or not satisfied, with no intermediate possibility. However, evaluation of other filter conditions (e.g., those based on the similarity between message content indicia and user interest indicia) may produce a range of results indicative of a degree to which the condition is satisfied. In one embodiment, when evaluation of filter conditions produces a range of possible values, a static threshold value may be employed to determine whether the conditions are satisfied. For example, a particular threshold value within the range may be chosen such that filter conditions evaluating to a value that is higher (or alternatively, lower) than the threshold value may be deemed to satisfy the filter conditions. Values equal to the threshold value may defined to satisfy or not satisfy the filter conditions in various embodiments.

Alternatively, when evaluation of filter conditions produces a range of possible values, in one embodiment, whether the filter conditions are deemed to be satisfied may be determined probabilistically, such that the probability that the filter conditions will be deemed satisfied is a function of the value produced. For example, evaluation of filter conditions may produce a range of values normalized to fall between 0 and 1. To determine whether a given one of these values satisfies the filter conditions in any given instance, a random or pseudorandom number may be generated within the same range and compared to the normalized filter condition value. If the normalized filter condition value is greater than or possibly equal to (or alternatively, less than or possibly equal to) the (pseudo)random value, the filter conditions may be deemed satisfied. Thus, the probability with which filter conditions are satisfied may be tuned based on the probability distribution used to generate the (pseudo)random value. For example, if a uniform probability distribution is used, then in one embodiment, a normalized filter condition value of 0.9 may satisfy the filter conditions 90% of the time, a value of 0.1 may satisfy the filter conditions 10% of the time, etc. This type of probabilistic filtering may be implemented such that if the filter conditions are satisfied, a corresponding message may be forwarded to all of the given node's peers. Alternatively, in some embodiments, the number of peers to which a message is forwarded may vary according to the probability with which a message is to be forwarded (e.g., as determined by the probability distribution used to generate the (pseudo)random value). For example, if evaluation of filter conditions yields a 90% probability of forwarding, the message may be forwarded to 90% of the given node's peers (rounded according to any suitable scheme). It is noted that in various such embodiments, the fraction of peers to which a message is forwarded may be any suitable function of the probability of forwarding, and need not correspond directly to that probability as in the example just given.

In some embodiments, the probability distribution used may be tuned such that the minimum probability that the filtering conditions will be satisfied is nonzero, regardless of the evaluation of the filter conditions. In other embodiments, the probabilistic techniques may be tuned such that the minimum number of nodes 100 to which any given message is forwarded is nonzero, irrespective of other factors. These sorts of techniques may ensure that a minimum volume of messages 300 are forwarded by the given node 100 regardless of the filtering conditions, which may help prevent portions of network 10 from effectively becoming partitioned or disconnected by filtering activity.

If the applicable filter conditions are satisfied, processing of the message 300 that is the subject of the detected message filtering event may continue (block 706). For example, in the case where the message filtering event corresponds to the arrival of a given message 300, continued processing of the given message 300 may include forwarding it to peer nodes 100. In the case where the message filtering event corresponds to generation of a message, continued processing of the given message 300 may include completing generation of the message and forwarding it to the originating node's peers. If the applicable filter conditions are not satisfied, the message 300 that is the subject of the detected message filtering event may be filtered (block 708). For example, the message 300 may be discarded entirely, forwarded to fewer than all peer nodes 100, or otherwise limited or constrained.

It is noted that embodiments of network 10 in which message filtering is combined with peer node reconfiguration (e.g., as described above with respect to FIG. 5) may exhibit complex dynamics. For example, message filtering that is performed by nodes 100 that are upstream from a given node 100 may help reduce the likelihood that a user of the given node 100 sees messages 300 in which he or she is not interested. By contrast, if the given node 100 reconfigures itself to add a peer node 100 that is farther upstream than a current peer, the given node 100 may reduce the likelihood that an intervening node 100 is filtering messages 300 before they reach the given node 100. Through such reconfiguration, the given node 100 may increase its exposure both to potentially interesting and potentially uninteresting messages 300. Correspondingly, in some embodiments, the effects of filtering may be taken into account when making reconfiguration decisions, such as evaluating the degree of separation between the given node 100 and a potential new peer node 100.

Also, in some embodiments, nodes 100 may be configured to restore prior node configurations dependent on the effects reconfiguration has on message filtering. For example, a given node 100 may track interest metrics for a newly added peer node 100, which may include tracking the history of uninteresting messages 300 received from the new peer node 100 (e.g., relative to indicia of content and user interest, as described above). If the given node 100 determines that the level of uninteresting messages 300 from the new peer node 100 exceeds a threshold (e.g., relative to the level of interesting messages 300 from that node, or relative to the behavior of other peer nodes 100), the given node 100 may be configured to delete the new peer node 100 and/or to restore the state of its peer node configuration prior to addition of the new peer node 100. For example, if an old peer node 100 was swapped for the new peer node 100, to restore the prior configuration, the given node 100 may restore its connection to the old peer node 100.

It is possible that in some cases, a particular peer node 100 may be a source of a variety of types of messages 300 that are interesting to a given node 100, and that by reconfiguring its peer nodes to replace the particular peer node 100 with a different node 100, the given node 100 may improve the quality or frequency of some types of messages 300 while reducing the quality or frequency of others. In one embodiment, the effects of reconfiguration on different types of messages 300 may be decoupled from one another by creating multiple, distinct instances of network 10 and dedicating each instance to a respective type of message 300. In various such embodiments, messages 300 may be distinguished by the type of content they refer to (e.g., text, image, audio, video or other types of content), by the type of subject matter they refer to (e.g., as defined according to keywords or other types of categories) or any other suitable distinction or combination thereof.

In one embodiment, multiple instances of network 10 may be created by instantiating more than one node 100 per user, such that the multiple networks 10 operate independently of one another. In such an embodiment, individual users may interact with several different nodes 100 depending on the type of content they are using. In another embodiment, multiple instances of network 10 may be created by configuring each node 100 to replicate its internal state indicative of its peer relationships for each network instance. For example, if a given node 100 maintains indications of the identities of its peers in a table or other data structure, to support multiple networks 10, the given node 10 may maintain multiple instances of this data structure, where each instance reflects the peer relationships of the given node 10 with respect to a corresponding instance of network 10. In such an embodiment, each user may interact with a single node 100. In various embodiments, nodes 100 may be configured to manage multiple instances of networks 10 in a manner transparent to users, or nodes 100 may expose details regarding the different networks 10 to users.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods of nodes 100 generating and forwarding messages 300 within network 10, nodes 100 reconfiguring their peer nodes, and/or nodes filtering messages 300 based on various conditions, as described above. Such instructions may be executed to perform a particular computational function, such as generating, sending or, receiving a message, to implement mathematical functions such as integration, differentiation, convolution, etc., as well as to implement higher-order functions such as, operating system functionality, network communications functionality, application functionality, and/or any other suitable functions.

Figure 8:
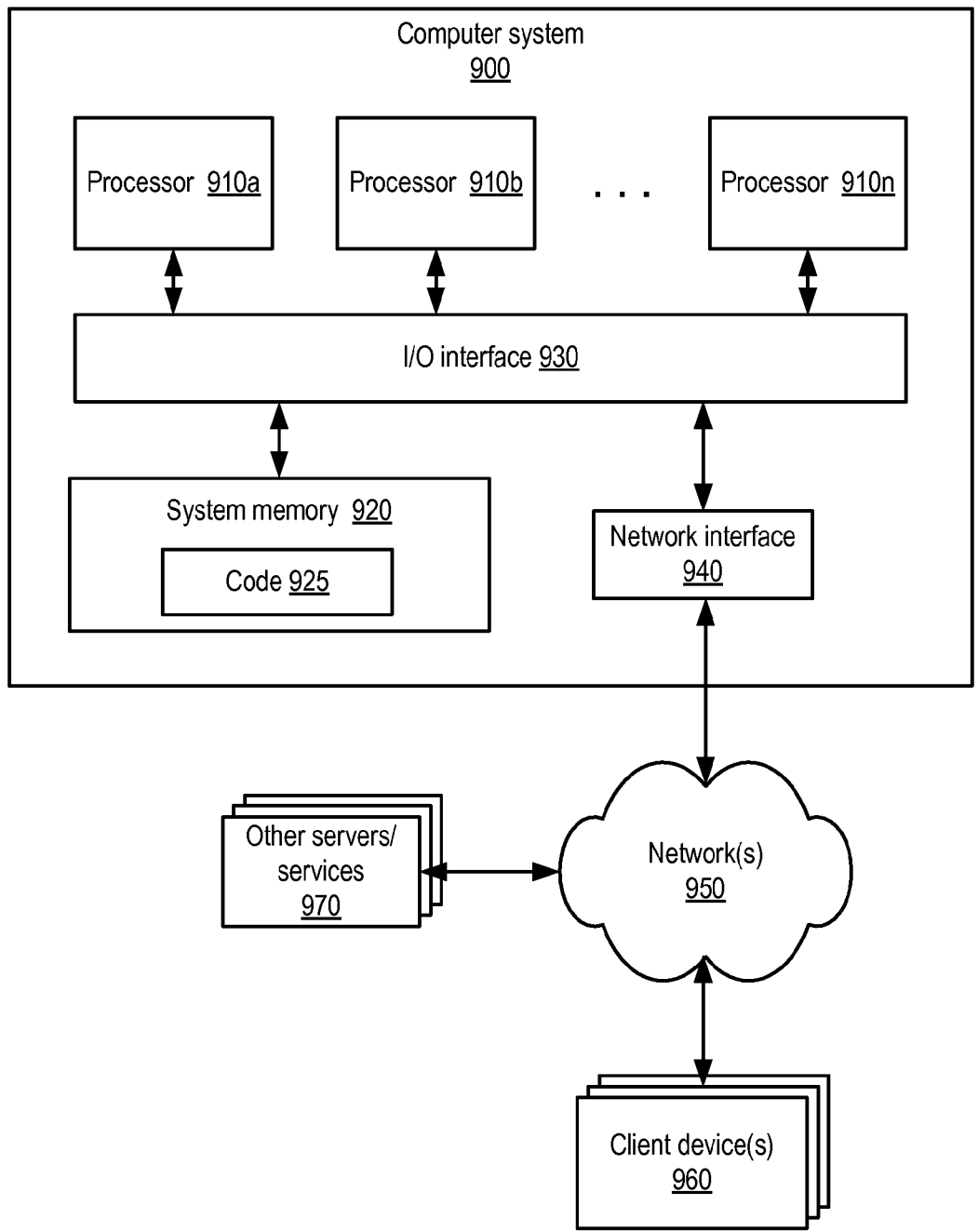
FIG. 8 is a block diagram illustrating an exemplary embodiment of a computer system.

One exemplary embodiment of a computer system including tangible, computer-accessible storage media is illustrated in FIG. 8. In the illustrated embodiment, computer system 900 includes one or more processors 910 coupled to a system memory 920 via an input/output (I/O) interface 930. Computer system 900 further includes a network interface 940 coupled to I/O interface 930. In different embodiments, system 900 may be variously configured as a server system, a desktop or notebook system, an embedded system, a handheld or portable client system, etc. In various embodiments, a single instance of computer system 900 may either implement a single node 100 or several nodes 100 (e.g., on behalf of the same or different users).

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 920 as code 925. It is noted that in some embodiments, code 925 may include instructions and data implementing desired functions that are not directly executable by processor 910 but are represented or encoded in an abstract form that is translatable to instructions that are directly executable by processor 910. For example, code 925 may include instructions specified in an ISA that may be emulated by processor 910, or by other code 925 executable on processor 910. Alternatively, code 925 may include instructions, procedures or statements implemented in an abstract programming language that may be compiled or interpreted in the course of execution. As non-limiting examples, code 925 may include code specified in a procedural or object-oriented programming language such as C or C++, a scripting language such as perl, a markup language such as HTML or XML, or any other suitable language.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 950, such as other computer systems or communications devices, for example. In particular, network interface 940 may be configured to allow communication between computer system 900 and client devices 960 and/or other servers/services 970 through various communications channels via network(s) 950. These client devices 960 may include various computing and communications devices, which may include elements similar to those of computer system 900. In particular, client devices 960 may include devices associated with various ones of other nodes 100, such as personal computers, telephony devices or other network-attached computing devices that users may employ to access network services, such as the message services offered by logical mesh network 10, for example. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. A computer-accessible medium may generally be accessible via transmission media or signals such as electrical, electromagnetic, or digital signals, conveyed via a communication medium such as a network and/or a wireless link, such as may be implemented via network interface 940.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A system, comprising:
a memory storing instructions; and
one or more processors coupled to said memory, wherein said instructions are executable by at least one of said one or more processors to implement a given logical node of a plurality of logical nodes of a logical mesh network, wherein said given logical node is configured to:
store identifying information of one or more peer logical nodes of said given logical node, wherein said one or more peer logical nodes are members of said plurality of logical nodes of said logical mesh network;
in response to detecting a message-passing event, generate and convey an outgoing message to at least some of said one or more peer logical nodes dependent upon said identifying information,
wherein said message passing event comprises an indication of interest at said given logical node in an item of respective network-based content that said given logical node has accessed,
wherein to detect said message-passing event, said given logical node is further configured to detect, via a user interface:
a user's indication that said outgoing message be generated, or
the user's request for creation of a bookmark;
wherein said outgoing message comprises a pointer to said item of respective network-based content stored remote from the plurality of logical nodes,
wherein said outgoing message includes indicia of said respective network-based content, and
wherein said given logical node does not convey said outgoing message to any logical node of said logical mesh network that is not a peer logical node of said given logical node; and
dependent upon indicia of network-based content included in one or more incoming messages received from said one or more peer logical nodes:
determine a degree to which said indicia match indicia of areas of interest for said given logical node; and
dependent on said degree, update said identifying information to add or delete a particular one of said logical nodes as a peer logical node of said given logical node, wherein said particular one of said logical nodes is a sender of the incoming message.

2. The system as recited in claim 1, wherein said network-based content comprises one or more of: text data, image data, audio data, or video data.

3. The system as recited in claim 1, wherein said network-based content comprises one or more of: an electronic mail message, a web page, an instant message, an RSS feed, a streaming audio feed, or a streaming video feed.

4. The system as recited in claim 1, wherein said given logical node is further configured to convey another outgoing message comprising at least part of a message received from one of said plurality of logical nodes to at least some of said one or more peer logical nodes.

5. The system as recited in claim 4, wherein said given logical node is configured to convey said other outgoing message in response to detecting receipt of said incoming message, wherein said other outgoing message comprises at least part of said incoming message.

21

6. The system as recited in claim 4, wherein said other outgoing message comprises:
a header field configured to indicate transmission history of said other outgoing message among ones of said logical nodes;
a subject field configured to indicate an indicia of respective network-based content for said other outgoing message; and
a payload comprising one or more of: said respective network-based content for said other outgoing message, or a reference to said respective network-based content for said other outgoing message.

7. The system as recited in claim 6, wherein said transmission history includes a respective indication of each one of said logical nodes through which said payload of said other outgoing message passed subsequent to being generated at an originating one of said logical nodes.

8. The system as recited in claim 6, wherein said transmission history includes a respective indication of fewer than all of said logical nodes through which said payload of said other outgoing message passed subsequent to being generated at an originating one of said logical nodes.

9. The system as recited in claim 6, wherein said reference to said respective network-based content for said other outgoing message comprises a Uniform Resource Locator (URL) or Uniform Resource Identifier (URI) corresponding to said respective network-based content.

10. The system as recited in claim 6, wherein said payload of said other outgoing message includes a payload of said incoming message.

11. The system as recited in claim 1, wherein to select said particular logical node to be added as a peer logical node dependent upon said indicia of network-based content included in said incoming message, said given logical node is further configured to determine a degree to which said indicia of network-based content match indicia of interests of a user of said given logical node.

12. The system as recited in claim 11, wherein to determine said degree to which said indicia of network-based content match indicia of said interests of said user, said given logical node is further configured to compare one or more keywords included in said indicia of network-based content with one or more keywords included in said indicia of interests of said user.

13. The system as recited in claim 1, wherein said given logical node is further configured to select said particular logical node to be added as a peer logical node dependent upon a history of prior messages received by said given logical node.

14. The system as recited in claim 13, wherein said given logical node is further configured to generate a respective interest metric corresponding to each logical node indicated in a transmission history of said incoming message, wherein each said respective interest metric is indicative of a history of messages received by said given logical node from a corresponding logical node.

15. The system as recited in claim 14, wherein to generate said respective interest metric for a given corresponding logical node, said given logical node is further configured to determine a degree to which indicia of network-based content included in messages received from said given corresponding logical node match indicia of interests of a user of said given logical node.

16. The system as recited in claim 1, wherein said given logical node is further configured to select said particular logical node to be added as a peer logical node from one or more logical nodes indicated in a transmission history included in said incoming message.

17. The system as recited in claim 1, wherein said given logical node is further configured to convey a particular outgoing message to said at least some of said one or more peer logical nodes dependent upon whether said particular outgoing message satisfies one or more filter conditions.

18. The system as recited in claim 17, wherein in response to determining that said particular outgoing message does not satisfy at least one of said one or more filter conditions, said given logical node is further configured to discard said particular outgoing message without conveying said particular outgoing message to said at least some of said one or more peer logical nodes.

19. The system as recited in claim 17, wherein to determine whether said particular outgoing message satisfies a given one of said one or more filter conditions, said given logical node is further configured to determine a degree to which said indicia of said respective network-based content included in said particular outgoing message match indicia of interests of a user of said given logical node.

20. The system as recited in claim 19, wherein said given logical node is further configured to determine whether said particular outgoing message satisfies said given one of said one or more filter conditions dependent upon a probabilistic function of said degree to which said indicia of said respective network-based content included in said particular outgoing message match indicia of interests of a user of said given logical node.

21. The system as recited in claim 17, wherein to determine whether said particular outgoing message satisfies a given one of said one or more filter conditions, said given logical node is further configured to determine whether said given logical node has previously received a payload included in said particular outgoing message.

22. The system as recited in claim 1, wherein to update said identifying information to add said particular one of said logical nodes as a peer logical node, said given logical node is further configured to delete an existing one of said one or more peer logical nodes, such that said particular logical node replaces said existing peer logical node.

23. The system as recited in claim 22, wherein subsequent to replacing said existing peer logical node with said particular logical node, said given logical node is further configured to restore a peer node configuration that existed prior to said replacing.

24. The system as recited in claim 23, wherein to restore said peer node configuration, said given logical node is further configured to restore said previously deleted existing peer logical node and to delete said particular logical node.

25. A computer-implemented method, comprising:
storing, by a given logical node of a plurality of logical nodes of a logical mesh network, identifying information of one or more peer logical nodes of said given logical node, wherein said one or more peer logical nodes are members of said plurality of logical nodes of said logical mesh network;
in response to detecting a message-passing event, generating and conveying, by said given logical node, an outgoing message to at least some of said one or more peer logical nodes dependent upon said identifying information,
wherein said message passing event comprises an indication of interest at said given logical node in an item of respective network-based content that said given logical node has accessed, wherein detecting said message-passing event comprises detecting user input indicating:
that said outgoing message is to be generated, or creation of a bookmark,
wherein said outgoing message comprises a pointer to said item of respective network-based content stored remote from the plurality of logical nodes,
wherein said outgoing message includes indicia of said respective network-based content,
wherein said given logical node does not convey said outgoing message to any logical node of said logical mesh network that is not a peer logical node of said given logical node; and
dependent upon indicia of network-based content included in one or more incoming messages received from said one or more peer logical nodes:
determining, by said given logical node, a degree to which said indicia match indicia of areas of interest for said given logical node; and
dependent on said degree, updating, by said given logical node, said identifying information to add or delete a particular one of said logical nodes as a peer logical node of said given logical node, wherein said particular one of said logical nodes is a sender of the incoming message.

26. The method as recited in claim 25, wherein said network-based content comprises one or more of: text data, image data, audio data, or video data.

27. The method as recited in claim 25, wherein said network-based content comprises one or more of: an electronic mail message, a web page, an instant message, an RSS feed, a streaming audio feed, or a streaming video feed.

28. The method as recited in claim 25, further comprising conveying another outgoing message comprising at least part of a message received from one of said plurality of logical nodes to at least some of said one or more peer logical nodes.

29. The method as recited in claim 28, wherein said conveying said other outgoing message is performed in response to detecting receipt of said incoming message, wherein said other outgoing message comprises at least part of said incoming message.

30. The method as recited in claim 28, wherein said other outgoing message comprises:
a header field configured to indicate transmission history of said other outgoing message among ones of said logical nodes;
a subject field configured to indicate an indicia of respective network-based content for said other outgoing message; and
a payload comprising one or more of: said respective network-based content for said other outgoing message, or a reference to said respective network-based content for said other outgoing message.

31. The method as recited in claim 30, wherein said transmission history includes a respective indication of each one of said logical nodes through which said payload of said other outgoing message passed subsequent to being generated at an originating one of said logical nodes.

32. The method as recited in claim 30, wherein said transmission history includes a respective indication of fewer than all of said logical nodes through which said payload of said other outgoing message passed subsequent to being generated at an originating one of said logical nodes.

33. The method as recited in claim 30, wherein said reference to said respective network-based content for said other outgoing message comprises a Uniform Resource Locator (URL) or Uniform Resource Identifier (URI) corresponding to said respective network-based content.

34. The method as recited in claim 30, wherein said payload of said other outgoing message includes a payload of said incoming message.

35. The method as recited in claim 25, further comprising said given logical node selecting said particular logical node to be added as a peer logical node dependent upon said indicia of network-based content included in said incoming message, wherein said selecting further comprises said given logical node determining a degree to which said indicia of network-based content match indicia of interests of a user of said given logical node.

36. The method as recited in claim 35, wherein determining said degree to which said indicia of network-based content match indicia of said interests of said user further comprises said given logical node comparing one or more keywords included in said indicia of network-based content with one or more keywords included in said indicia of interests of said user.

37. The method as recited in claim 25, further comprising said given logical node selecting said particular logical node to be added as a peer logical node dependent upon a history of prior messages received by said given logical node.

38. The method as recited in claim 37, further comprising said given logical node generating a respective interest metric corresponding to each logical node indicated in a transmission history of said incoming message, wherein each said respective interest metric is indicative of a history of messages received by said given logical node from a corresponding logical node.

39. The method as recited in claim 38, wherein generating said respective interest metric for a given corresponding logical node comprises said given logical node determining a degree to which indicia of network-based content included in messages received from said given corresponding logical node match indicia of interests of a user of said given logical node.

40. The method as recited in claim 25, further comprising said given logical node selecting said particular logical node to be added as a peer logical node from one or more logical nodes indicated in a transmission history included in said incoming message.

41. The method as recited in claim 25, further comprising said given logical node conveying a particular outgoing message to a portion of said one or more peer logical nodes dependent upon whether said particular outgoing message satisfies one or more filter conditions.

42. The method as recited in claim 41, further comprising said given logical node discarding said particular outgoing message without conveying said particular outgoing message to said portion of said one or more peer logical nodes in response to determining that said particular outgoing message does not satisfy at least one of said one or more filter conditions.

43. The method as recited in claim 41, wherein determining whether said particular outgoing message satisfies a given one of said one or more filter conditions comprises said given logical node determining a degree to which said indicia of said respective network-based content included in said particular outgoing message match indicia of interests of a user of said given logical node.

44. The method as recited in claim 43, wherein said given logical node determining whether said particular outgoing message satisfies said given one of said one or more filter conditions is dependent upon a probabilistic function of said degree to which said indicia of said respective network-based content included in said particular outgoing message match indicia of interests of a user of said given logical node.

45. The method as recited in claim 41, wherein determining whether said particular outgoing message satisfies a given one of said one or more filter conditions further comprises said given logical node determining whether said given logical node has previously received a payload included in said particular outgoing message.

46. The method as recited in claim 25, wherein updating said identifying information to add said particular one of said logical nodes as a peer logical node comprises said given logical node deleting an existing one of said one or more peer logical nodes, such that said particular logical node replaces said existing peer logical node.

47. The method as recited in claim 46, further comprising said given logical node restoring a peer node configuration that existed prior to said replacing subsequent to replacing said existing peer logical node with said particular logical node.

48. The method as recited in claim 47, wherein restoring said peer node configuration comprises said given logical node restoring said previously deleted existing peer logical node and deleting said particular logical node.

49. The method as recited in claim 25, wherein said one or more peer logical nodes comprise an initial set of peer logical nodes selected based on identifiers corresponding to respective users of the one or more peer logical nodes related to a user of the given logical node by the user's contacts in a social network.

* * * * *